United States Patent
Zhu et al.

(10) Patent No.: US 10,440,682 B2
(45) Date of Patent: Oct. 8, 2019

(54) METHODS AND APPARATUSES FOR DYNAMIC BEAM PAIR DETERMINATION

(71) Applicant: QUALCOMM Incorporated, San Diego, CA (US)

(72) Inventors: Jun Zhu, San Diego, CA (US); Raghu Narayan Challa, San Diego, CA (US); Alexei Yurievitch Gorokhov, San Diego, CA (US); Junyi Li, Chester, NJ (US); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/841,182

(22) Filed: Dec. 13, 2017

(65) Prior Publication Data

US 2019/0182805 A1 Jun. 13, 2019

(51) Int. Cl.
*H04W 72/02* (2009.01)
*H04W 72/10* (2009.01)
*H04B 7/0408* (2017.01)
*H04B 7/06* (2006.01)
*H04W 72/08* (2009.01)

(52) U.S. Cl.
CPC .......... *H04W 72/02* (2013.01); *H04B 7/0408* (2013.01); *H04B 7/0691* (2013.01); *H04W 72/085* (2013.01); *H04W 72/10* (2013.01); *H04B 7/0695* (2013.01)

(58) Field of Classification Search
CPC ... H04W 72/02; H04W 72/10; H04W 72/085; H04B 7/0408; H04B 7/0691; H04B 7/0695
See application file for complete search history.

(56) References Cited

U.S. PATENT DOCUMENTS

| | | | |
|---|---|---|---|
| 2013/0094439 A1* | 4/2013 | Moshfeghi | H04W 88/06 370/328 |
| 2015/0236774 A1* | 8/2015 | Son | H04B 7/0628 375/267 |
| 2017/0041051 A1* | 2/2017 | Rahman | H04B 7/0482 |
| 2017/0207845 A1* | 7/2017 | Moon | H04B 7/088 |
| 2017/0208494 A1* | 7/2017 | Moon | H04W 24/10 |
| 2017/0214444 A1* | 7/2017 | Nigam | H04B 7/063 |
| 2017/0223744 A1* | 8/2017 | Qian | H04W 74/0833 |
| 2018/0092156 A1* | 3/2018 | Kim | H04W 76/27 |
| 2018/0146419 A1* | 5/2018 | Raghavan | H04B 7/0456 |

* cited by examiner

*Primary Examiner* — Stephen J Clawson
(74) *Attorney, Agent, or Firm* — Qualcomm Incorporated

(57) ABSTRACT

The choice of a transmit (Tx)-Receive (Rx) beam pair out of many available beam pairs between a base station and a millimeter wave (mmW)-capable UE is directly related to the performance of transmission between the base station and the UE. A method, apparatus, and computer-readable medium at a transmitting user equipment (UE) capable of (mmW) communication are disclosed to determine a new serving Tx-Rx beam pair based on priorities of the plurality of Tx-Rx beam pairs. The UE may select a Transmit (Tx)-Receive (Rx) beam pair from a plurality of Tx-Rx beam pairs available at the UE for measurement, based in part on a priority of the Tx-Rx beam pair, and update the priority of the selected Tx-Rx beam pair based in part on a combination of static information and dynamic information of the selected Tx-Rx beam pair.

24 Claims, 11 Drawing Sheets

METHODS AND APPARATUSES FOR DYNAMIC BEAM PAIR DETERMINATION

BACKGROUND

Field

The present disclosure relates generally to wireless communication systems, and more particularly, to a methods and apparatuses for dynamic beam pair selection.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Wireless communication systems may also include or support networks used for vehicle based communications, also referred to as vehicle-to-everything (V2X), vehicle-to-vehicle (V2V) networks, and/or cellular V2X (C-V2X) networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

Such network supporting vehicle based communications, however, may also be associated with various requirements, e.g., communication requirements, security and privacy requirements, etc. Other example requirements may include, but are not limited to, reduced latency requirements, higher reliability requirements, and the like. For example, vehicle-based communications may include communicating sensor data that may support self-driving cars. Sensor data may be used between vehicles to improve the safety of self-driving cars.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The choice of a transmit (Tx)-Receive (Rx) beam pair out of many available beam pairs between a base station and a mmW-capable UE is directly related to the performance of transmission between the base station and the UE. A currently prevalent approach to selecting a serving Tx-Rx beam pair is to measure each beam pair from multiple available beam pairs in a round-robin manner and to determine a new serving beam pair based on the measurement results. In this round-robin manner, every beam pair has equal opportunity to be measured in a synchronization cycle. In fact, due to factors such as line of sight (LoS) and proximity between the beam pairs, chances for the beam pairs to be selected as the serving beam pair are different. The round robin approach does not distinguish among the beam pairs and thus may result in long latency in selecting the serving beam pair.

Thus, there is a need for a method, apparatus, and computer-readable medium at a user equipment (UE) in a mmW communications environment to assign a priority to each beam pair, taking into consideration dynamic information and static information of the beam pair, to quickly converge on one a good serving beam pair.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
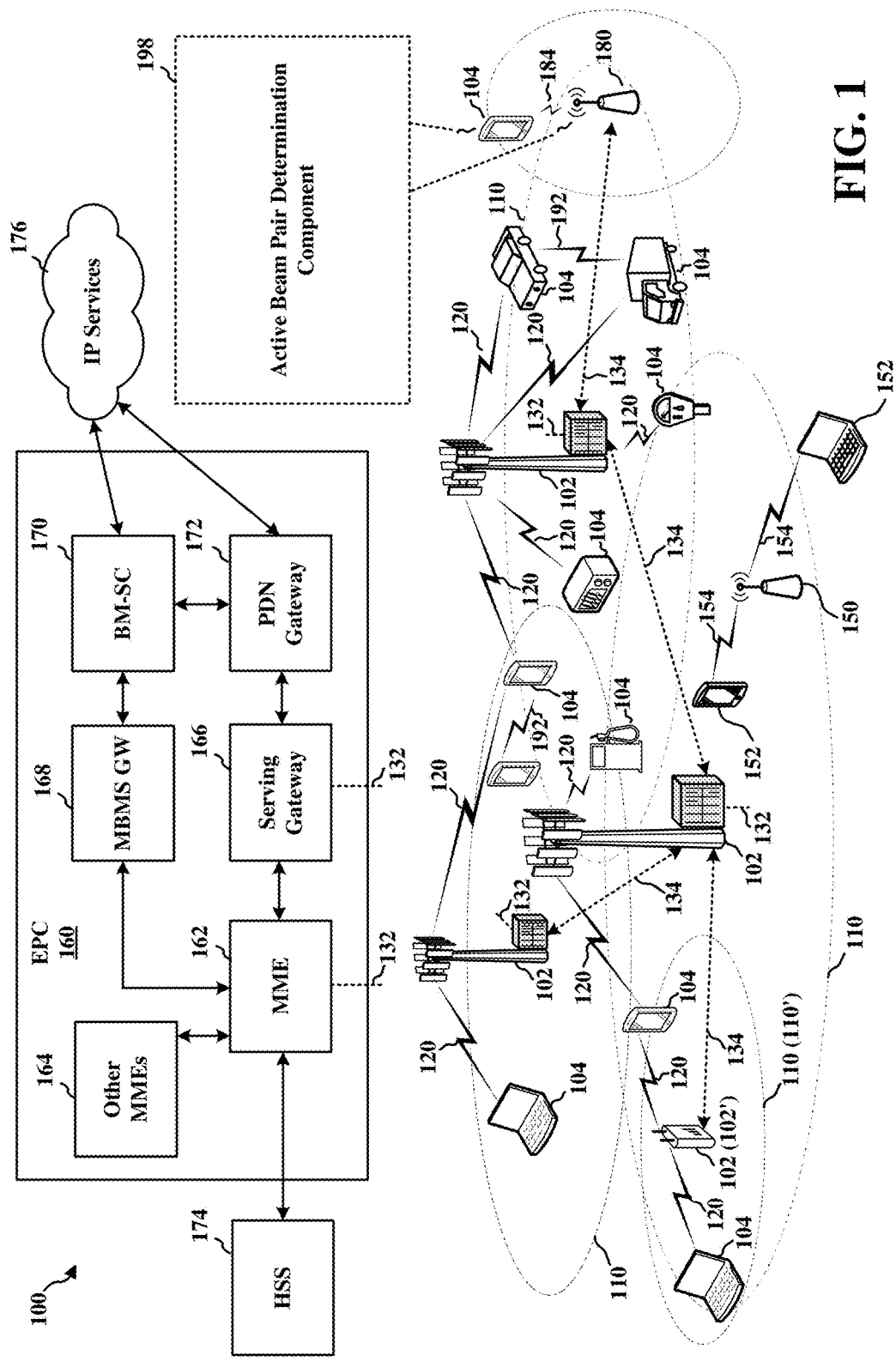
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104s may be configured to include a serving beam pair selection component (198) that enables the UEs 104 to determine a serving beam pair among multiple beam pairs efficiently. This in turn enables the UE to set up a link between the UE and the base station with minimal latency, especially in a dynamical environment, where the UE is in a fast motion and the current serving beam pair may need frequent updating.

Figure 2:
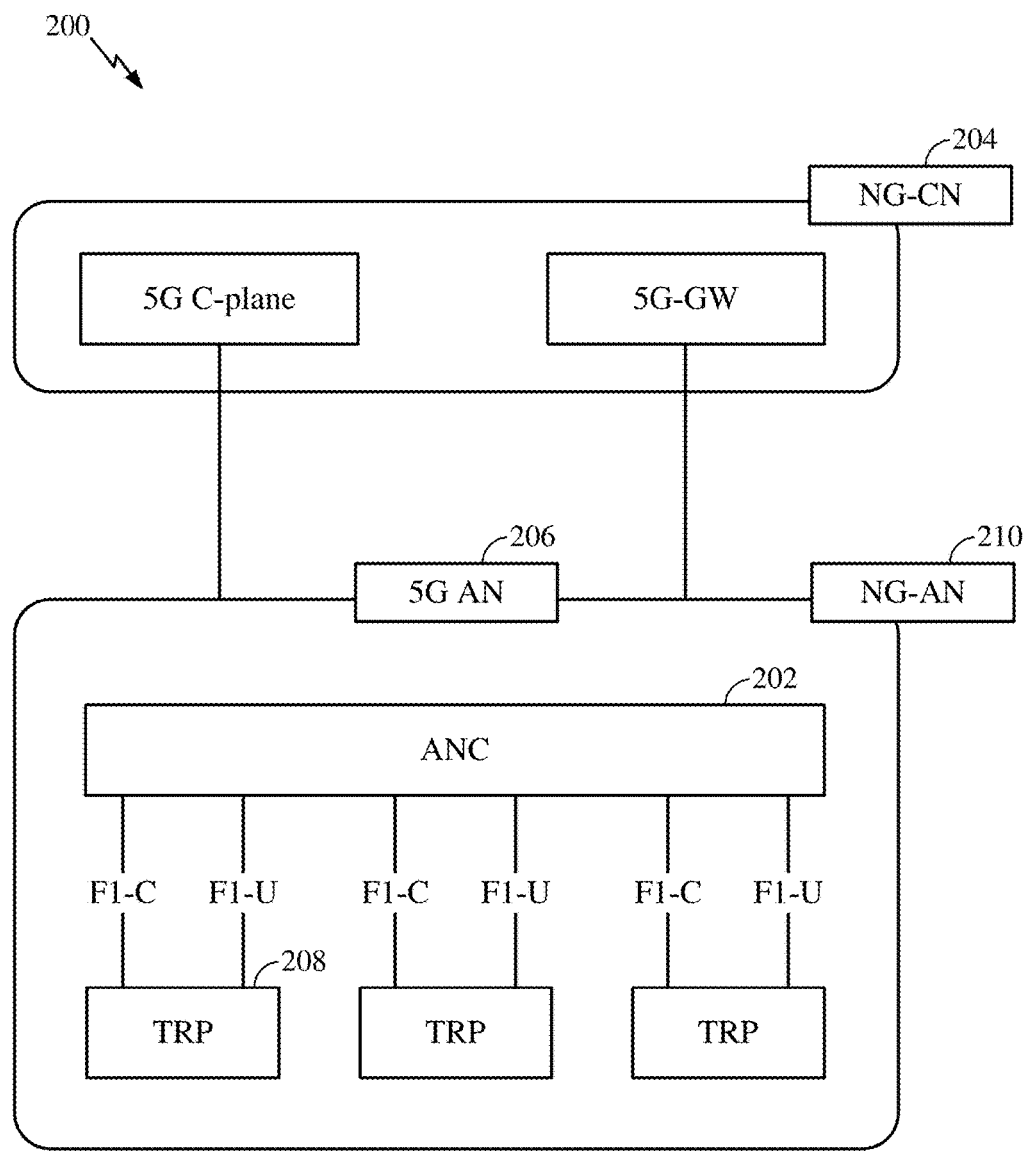
FIG. 2 illustrates an example logical architecture of a distributed radio access network.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. In one example aspect, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
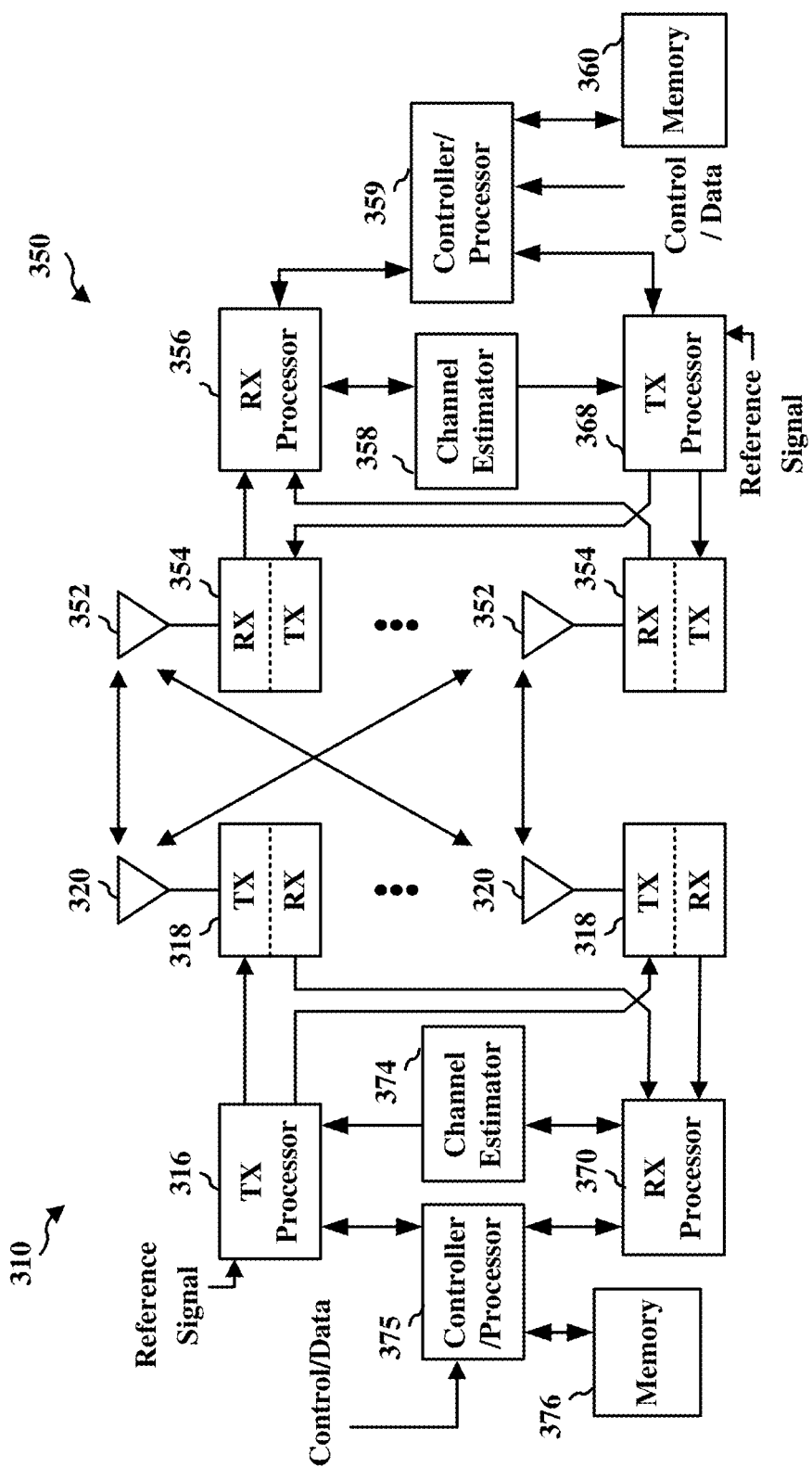
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
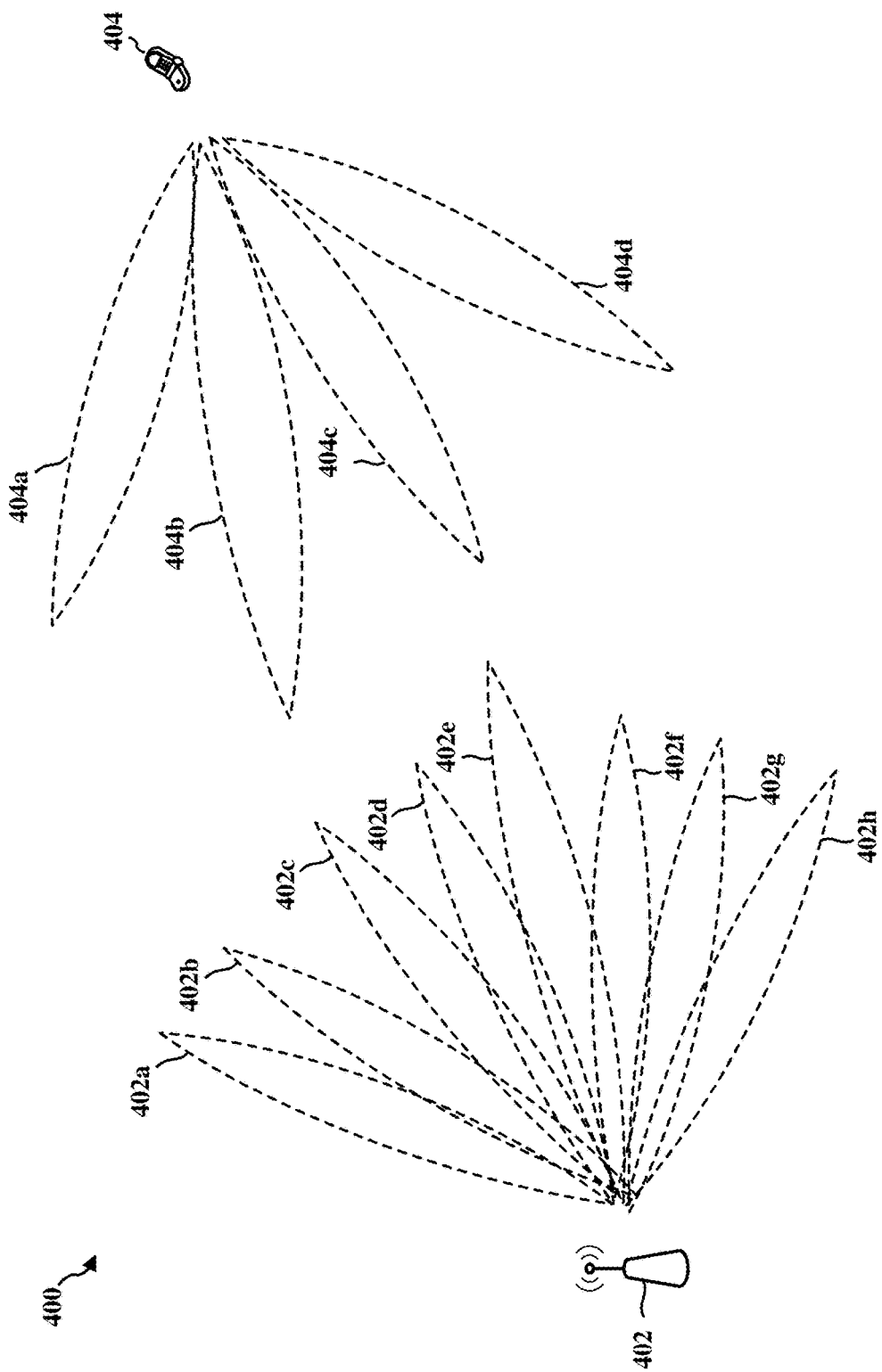
FIG. 4 is a diagram illustrating a base station in communication with a UE in accordance with one or more aspects of the present disclosure.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5A:
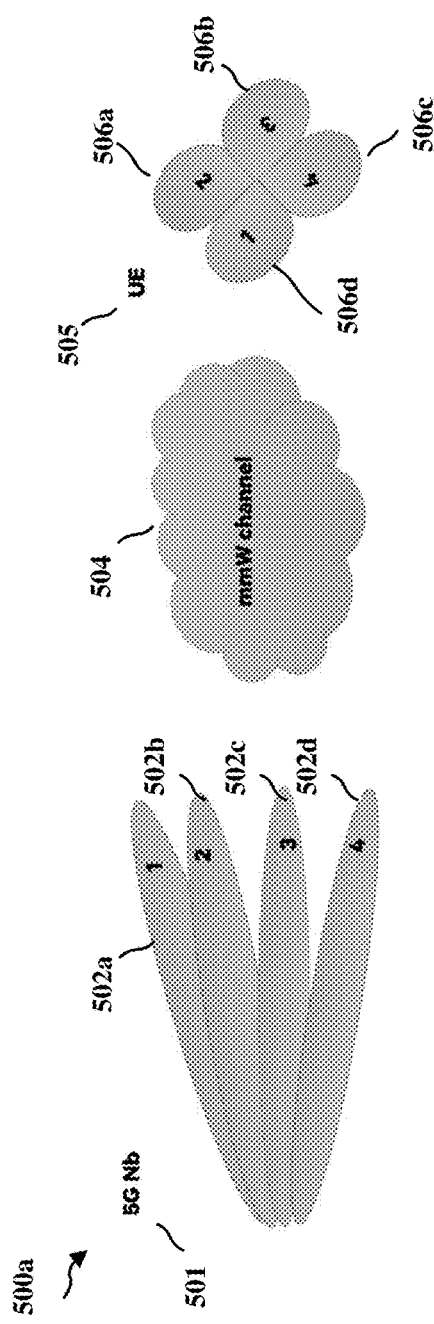
FIG. 5A is a diagram illustrating a base station in communication with a UE in accordance with one or more aspects of the present disclosure.

FIG. 5a is a diagram 500a illustrating a base station 501 in communication with a UE 505, in accordance with one or more aspects of the present disclosure. The diagram 500a shows a set of transmit beam 502a-502d at a 5G base station and a set of receive beam 506a-506d at the UE. One of the transmit beams 502a-502d may pair up with one of the receive beam 506a-506d to form a serving Tx-Rx beam pair to carry a signal through a millimeter wave channel 504 between the base station 501 and the UE 505.

In one example aspect, before any communication between 5G mmW base station 501 and the UE 505, the base station 501 may first broadcast all 4 (Tx) beams 1-4 or 502a-502d in a beam reference signal (BRS) cycle to all the device in the transmission range. The UE 505 in turn pairs up the received Tx beams with its Rx beams to find the most suitable beam pair for transmissions between the UE 505 and the base station 501. Larger the number of Tx beams and number of Rx beams are, longer it may take to find the most suitable beam pair, or a new serving beam pair. In the diagram 500, there are 4 Tx beams and 4 Rx beams. That is, the size of Tx beams and Rx beams are M=4, and N=4 respectively.

A BRS cycle is a synchronization cycle which may include a predetermined number of synchronization periods. Different terms may be used for a synchronization period. For example, a synchronization period may be referred to as a synchronization frame (SF). During a synchronization frame, a number of candidate Tx-Rx beam pairs may be selected and measured to determine a new serving Tx-Rx beam pair. For example, in one SF, each of Tx beams may be paired with one of the Rx beams to form a candidate Tx-Rx beam pair sequence for beam pair measurement, if the selection method is to allow Tx beams to vary. To select a reasonably stable serving beam pair, predetermined number of synchronization cycles may be needed.

The quality of a candidate Tx-Rx beam pair, in one aspect, may be measured in terms of beam gain. Several factors may affect the measured beam gain of a candidate beam pair, including line of sight (LoS). In general, a beam pair with LoS has a better beam gain than a beam pair without LoS, provided everything else being equal.

In one example aspect, during one synchronization cycle, all Tx beams are expected to emit in a fixed pattern, because a base station may not change its location frequently. Referring to FIG. 5a again, the Tx-Rx beam pair (2,1) and the Tx-Rx beam pair (3,1) are expected to have better beam gains because Rx beam 1 has a LoS with the Tx beams 2 and 3, if only LoS is considered for beam gain measurements.

Figure 5B:
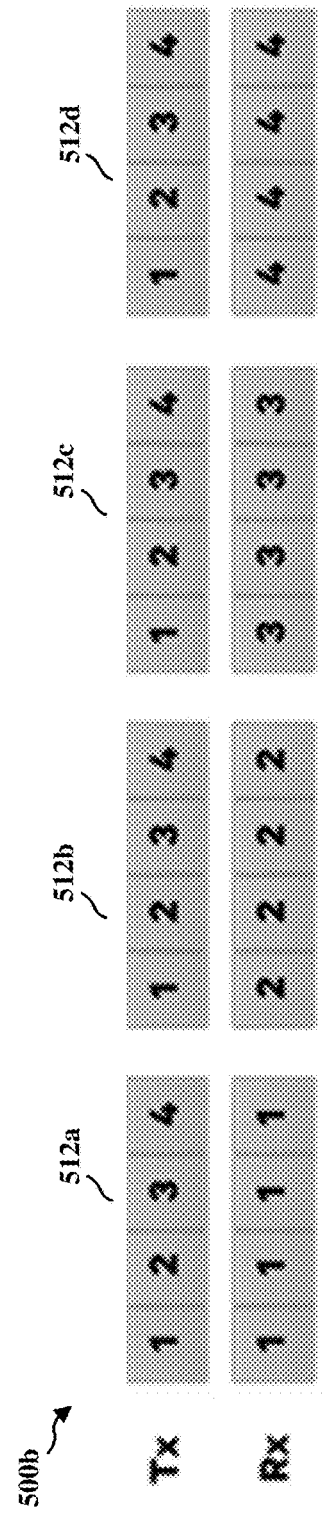
FIG. 5B illustrates example sequence of beam pairs for measurement, in accordance with one or more aspects of the present disclosure.

FIG. 5b illustrates an example sequence 500b of Tx-Rx beams pairs, in accordance with one or more aspects of the present disclosure. Based on the Tx-Rx beam pairs of FIG. 5a, FIG. 5b illustrates a sequence of beam pairs for measurement based on a round-robin approach. The example sequence 500b illustrates a synchronization cycle or BRS cycle that includes 4 synchronization frames 512a-512d. According to the round robin approach, one of the Rx beams is selected sequentially to pair with each of Tx beams within a SF to form M candidate beam pairs for beam gain measurement, M being the size of Tx beam set. As shown in FIG. 5b, during the SF 512a, the Rx beam 1 is paired with each of the 4 Tx beams 1 through 4, for measurement, and then next Rx beam, Rx beam 2, is paired with each of the 4 Tx beams 1 through 4 for measurement. All N Rx beams are measured in a round-robin fashion.

According to the existing approach, it normally requires at least a complete BRS or synchronization cycle for all Rx beams to be paired with Tx beams for beam gain measurement to find a new serving Tx-Rx beam pair. As a UE may have more than one Rx beam, it may take a number of BRS cycles before finding a suitable serving beam pair. This may result in a non-trivial latency and undesirable delay in establishing a connection between the base station and the UE. Based on the round-robin approach to determining a new serving Tx-Rx beam pair, the length of latency is proportional to the number of Rx beams.

Thus, the existing round-robin approach likely wastes synchronization SF resources, in part because some of the beam pair may have little or zero chance to be selected as the serving beam pair, due to their directions, lack of LoS or other factors. For example, referring to both FIG. 5a and FIG. 5b, Tx beam 2 and 3 should see more gains than 1 and 4, if LoS is assumed. Accordingly, assigning the 4 Tx beams the same equal opportunity for measurement in one BRS cycle may not be necessary and may be wasteful.

Figure 6:
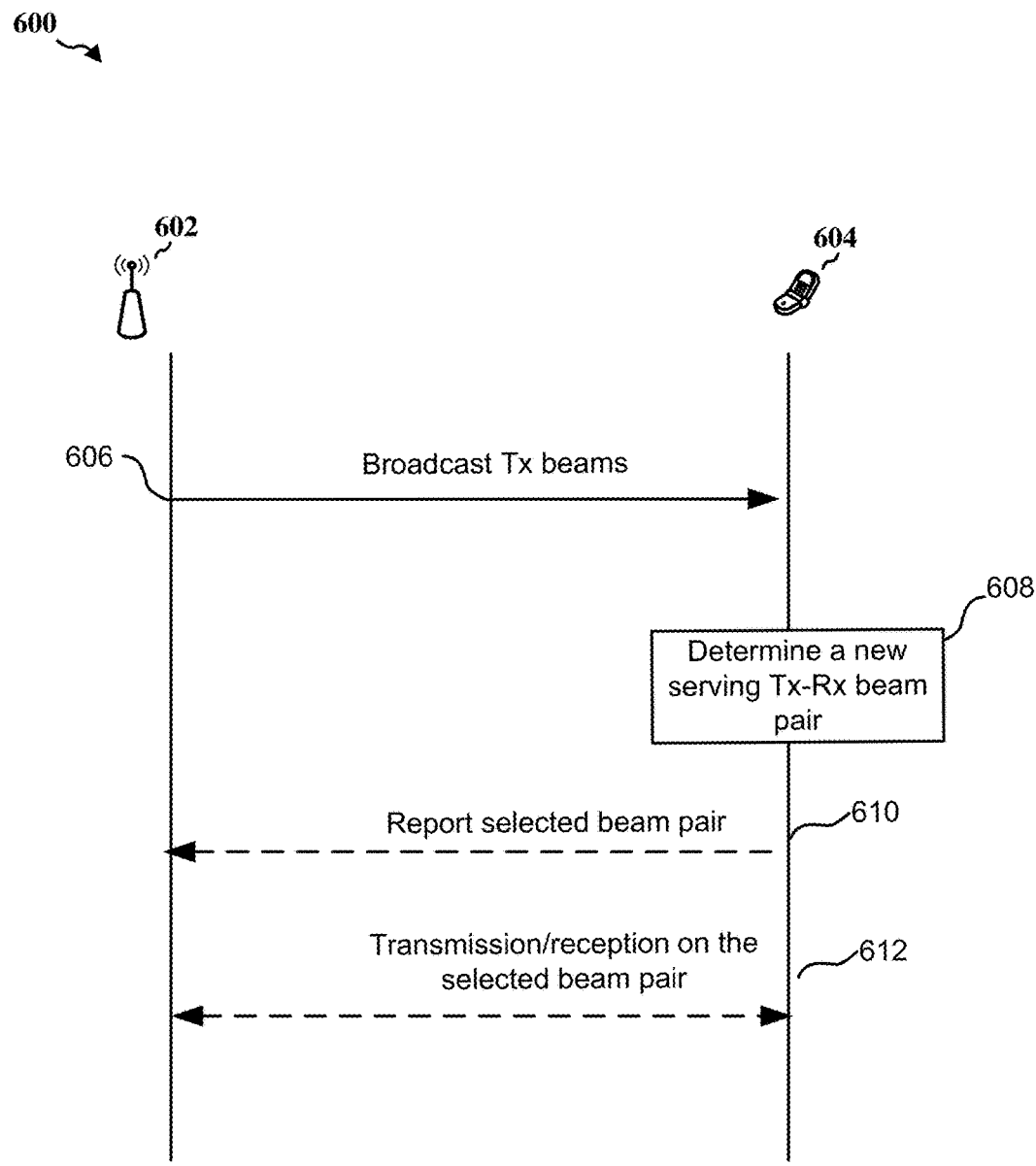
FIG. 6 illustrates an example of a wireless communications system that supports dynamic beam selection in accordance with one or more aspects of the present disclosure.

FIG. 6 illustrate an example of a wireless communications system 600 that supports dynamic beam pair selection in accordance with one or more aspects of the present disclosure. The wireless communications system 600 includes a base station 602 and a UE 604. At 606, the base station 602 broadcast Tx beams available at the base station 602.

Figure 7:
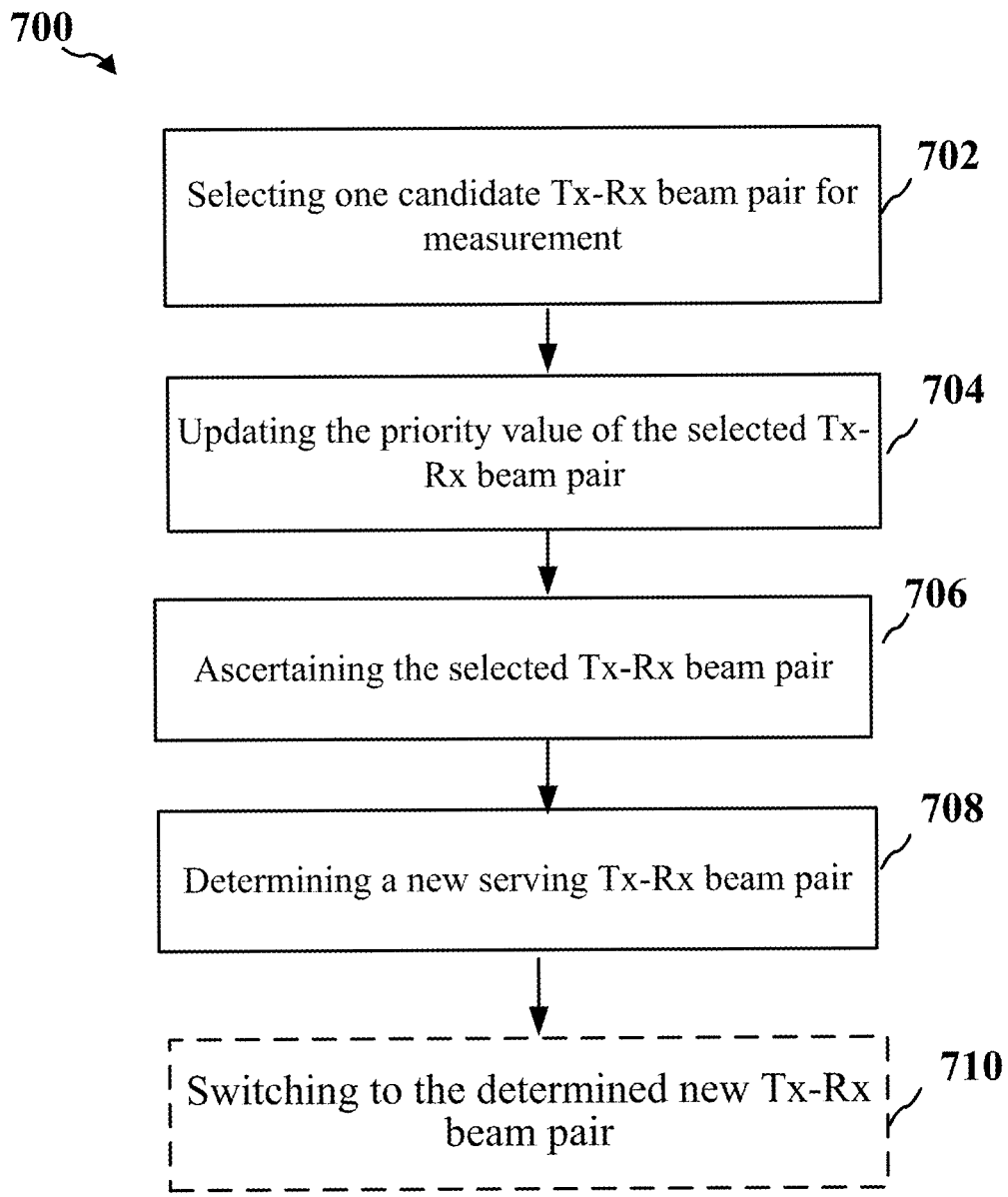
FIG. 7 is a flowchart of a method of wireless communication in accordance with one or more aspects of the present disclosure.
Figure 10:
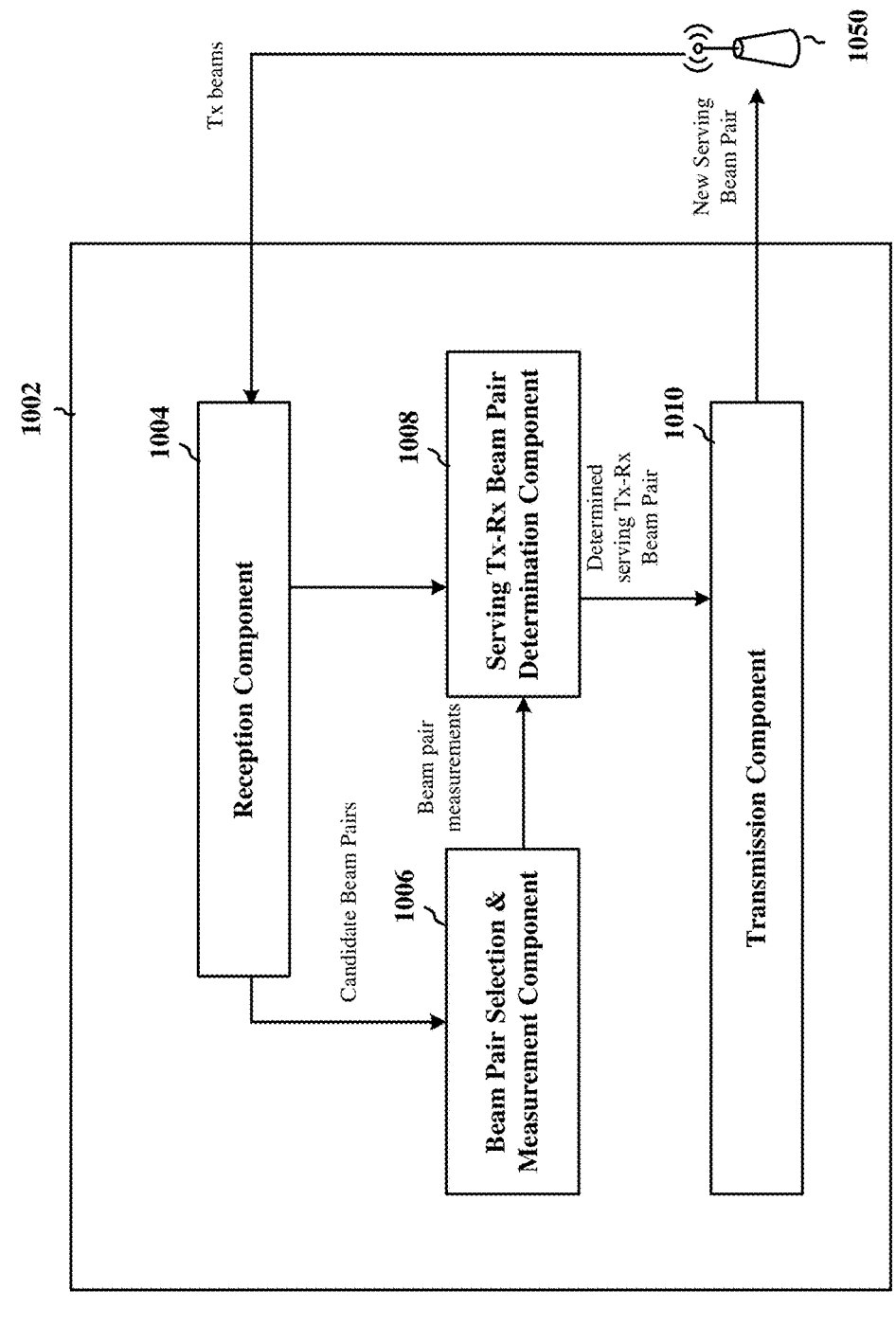
FIG. 10 is a conceptual data flow diagram illustrating the data flow between different means/components in an exemplary apparatus in accordance with one or more aspects of the present disclosure.
Figure 11:
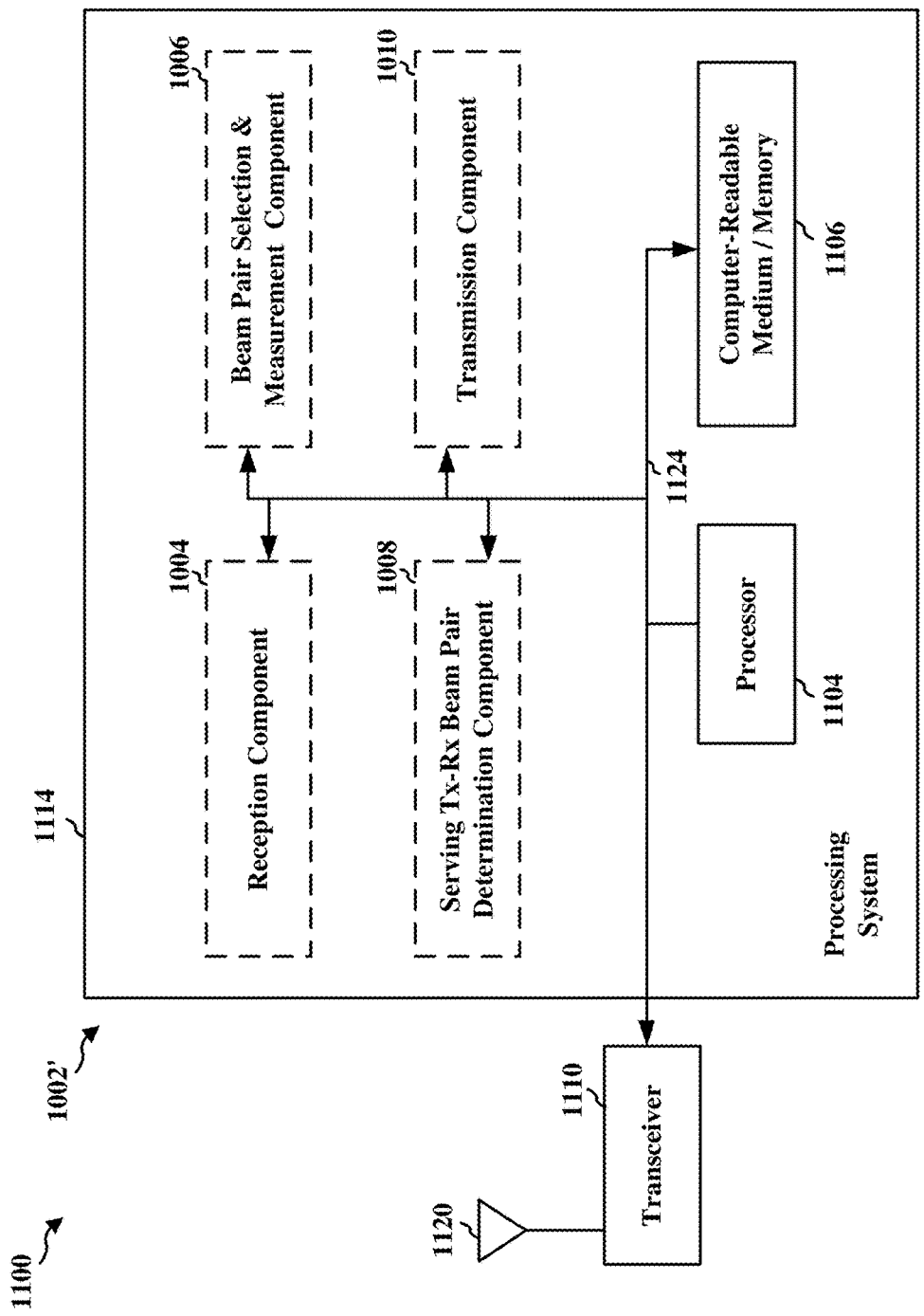
FIG. 11 is a diagram illustrating an example of a hardware implementation for an apparatus employing a processing system in accordance with one or more aspects of the present disclosure.

At 608, the UE 606 applies a dynamic beam pair selection process, such as the one illustrated in FIG. 7, to select candidate Tx-Rx beam pairs for measurement based on the priority of each beam pair. The phrase beam pair selection is also termed beam pair scheduling. Based on the dynamic beam pair selecting process, those beam pairs with higher priorities have more chances to be selected for measurement. Thus, those beam pairs have better opportunities to become the new serving beam pair. This may result in an improved latency and delay in finding a suitable serving beam pair and establishing a connection between the base station and the UE. The details of the beam pair scheduling or selection method are shown in FIGS. 7, 10, and 11 and described in the corresponding sections.

At 610, the UE 604 reports the determined new serving beam pair to the base station 602. Then at 612, the UE 604 and base station 602 receive and transmit data using the new serving beam pair.

FIG. 7 is a flowchart for a method 700 of wireless communication in accordance with one or more aspects of the present disclosure. The method 700 may be performed by one of the UEs 104 of FIG. 1, the UE350 of FIG. 3, the UE 604 of FIG. 6, or apparatus 1002/1002' of FIGS. 10 and 11. An optional step is indicated in a dashed boarder.

At 702, the method 700 includes selecting one candidate Tx-Rx beam pair by the UE, based in part on a priority value, or priority for short, associated with the candidate Tx-Rx beam pair. In contrast to an existing round-robin approach, which assigns equal likelihood to all beam pairs, the likelihood of the beam pair being selected for measurement may not be the same as that of other beam pairs. The priority value represents the likelihood of the beam pair being selected for measurement and thus the chance of the candidate beam pair eventually becoming the new serving Tx-Rx beam pair. As will be explained shortly, the priority value is based on a combination of static information and dynamic information associated with the candidate Tx-Rx beam pair.

Figure 8:
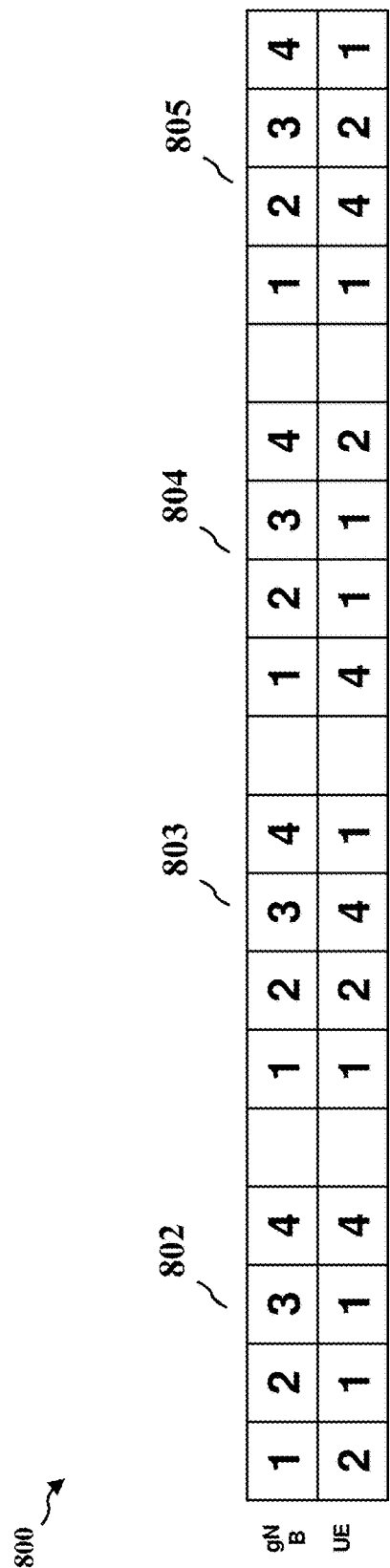
FIG. 8 illustrates an example sequence of beam pair for measurement, in accordance with one or more aspects of the present disclosure.

The UE selects a candidate beam pair also based on a beam pattern of the Tx-Rx beam pairs. In one example aspect, the Tx beams have a fixed pattern. That is, the base station such as a gNB may broadcast a fixed sequence of Tx beams that the gNB expects a UE to follow, in measurements or other situations. There may be various reasons for a fixed Tx beam pattern, such as a gNB design choice by a gNB vendor or a choice by a service provider that operates the gNB. As a result, the UE may freely select a Rx beam but follows a fixed emission pattern of the Tx beams. For example, FIG. 8 shows a sequence of beam pairs with a fixed Tx beam pattern that has a sequence the Tx beams ranging from Tx beam 1 to Tx beam 4, sequentially. In most scenarios, it is assumed that the antenna arrays at a base station are stationary in relation to the UE.

In one example aspect, selecting the Tx-Rx beam pair may include selecting the Tx-Rx beam pair for a number of time for re-measurements during a predetermined number of synchronization cycles. The number of times for re-measurements is proportional to the priority value of the selected beam pair relative to priority values of other Tx-Rx beam pairs. In other words, a candidate beam pair with a higher priority value may be selected for measurement and re-measurements more frequently than a candidate beam pair with a lower priority value.

At 704, the method 700 includes updating the priority value of the selected beam pair. In one example aspect, the priority value may be based on two types of information: static information and dynamic information. In one aspect, the static information of Tx-Rx beam pair may include spatial relationship between the Tx-Rx beam pair, such as proximity information, a line of sight (LoS) and non LoS (NLoS), among others.

The dynamic information of the priority value may include the information that may change from one instance to the next, and from one measurement to the next. In one example aspect, the dynamic information may include one or more of the latest beam measurements of the selected Tx-Rx beam pair.

In one example aspect, the static information and the dynamic information each may have an associated weight for updating the priority value. The associated weight may be adjustable, based on the circumstances. For example, if the UE is expected to be in a very dynamic environment, the weight for the dynamic information may be greater relative to that of the static information.

In one example aspect, updating the priority for the selected beam pair may include one or more of: updating the weight associated with the static information, updating the weight associated with the dynamic information, and combining the dynamic information and the static information of the Tx-Rx beam pair, based in part on one or both of the two weights. In one example aspect, updating the priority value is performed in such a way that a higher priority value results in a higher chance of the Tx-Rx beam pair being selected for the measurement and re-measurements.

In one example aspect, the static and dynamic information may be combined, first based on the dynamic information and then on the static information. For example, for each beam pair, a priority is calculated based on the dynamic information such as one or more latest beam measurements of the beam pair. The beam pair with the highest priority value may be selected or scheduled for measurement or re-measurement. When multiple beam pairs have a same priority value, the static information such as spatial neighboring relationship with the current serving beam pair is then factored into consideration to distinguish between the beam pairs. Other similar or alternative approaches to combining the dynamic information and static information for determination of a priority value for a beam pair may also be employed, depending on specific circumstances.

At 706, the method 700 includes ascertaining the selected beam pair by the UE. In one example, ascertaining the selected beam pair may include repeating the step of selecting the beam pair at 702 and updating the priority value for the selected beam pair at 704 for a number of times during a predetermined number of synchronization cycles. One effect of ascertaining the selected beam pair is to ensure that the measurement obtained from the selected beam pair achieves certain degree of reliability. This is particularly relevant when the UE is in a very dynamic environment. For example, if the UE is in a fast rotation motion, the Rx beams may change their physical locations relative to the fixed Tx beam pattern at a high frequency. Thus, one measurement that is valid at one moment may not be valid at next moment.

At 706, in an alternative aspect, ascertaining the selected beam pair may include ascertaining selected n beam pairs which have highest priority values in the current round of measurement. This is in place of selecting beam pair at 702 and updating the priority value at 704 for a large number of times. The number n may be predetermined and adjustable. This may result in a faster convergence on a new serving beam pair.

At 708, the method 700 includes determining a new serving Tx-Rx beam pair for transmissions between the UE and the base station. In one example aspect, the UE determines the new serving Tx-Rx beam pair by selecting the Tx-Rx beam pair with a highest priority value, after ascertaining selected candidate beam pairs for a predetermined number of synchronization cycles.

At 710, the method 700 includes switching to the newly determined Tx-Rx beam pair from the current Tx-Rx beam pair. Then the UE may carry on transmissions with the base station on the new serving Tx-Rx beam pair. In one example aspect, the newly determined Tx-Rx beam pair may be the same as the current serving Tx-Rx beam pair. In this case, the step at 710 may be avoided.

The method 700 may be triggered for various occasions. One such occasion is when the UE enters transmission range of the base station and just receives the Tx beams broadcast from the base station. Another occasion is when the UE's location has changed in a non-trivial way such that the current serving beam is no longer effective and the performance of the current serving Tx-Rx beam pair has degraded beyond a predetermined threshold.

The method 700 is for illustration purpose and shows one possible process for selecting candidate beam pairs for measurement and for determining a new serving beam pair. In practice, one or more steps shown in illustrative flowchart for the method 700 may be combined with other steps, performed in any suitable order, performed in parallel (e.g., simultaneously or substantially simultaneously), or removed. For example, updating the priority value of the selected Tx-Rx beam pair at 704 may be performed in parallel to or before ascertaining the selected Tx-Rx beam pair at 706.

FIG. 8 illustrates an example beam pair sequence 800 for measurement, in accordance with one or more aspects of the present disclosure. The beam pair sequence 800 includes four synchronization periods 802-805 and within each synchronization period, four beam pairs are selected and measured. In contrast to the equal-opportunity, round-robin fixed sequence of beam pairs for measurement, as shown in FIG. 5b, FIG. 8 shows a sequence of beam pairs with a fixed Tx beam pattern. In FIG. 8, the UE can freely choose Rx beams, but not Tx beams. For example, during the synchronization periods 802-805, the UE follows a fixed Tx beam pattern, selecting Tx beam 1 through Tx beam 4 sequentially during each of the synchronization periods.

In another example aspect, a higher priority value of a selected beam pair may result in more opportunities for the beam pair to be selected for measurement and re-measurements. As discussed earlier, the priority value of a beam pair may be based on dynamic information and static information. In one example scenario, the Tx-Rx beam pairs (2,1) and (3,1) may have higher priority values, in part because the weight for the static part of the priority value may be greater. For example, Rx beam 1 has at least partial LoS with Tx beams 2 and 3, as shown in FIG. 5a. Thus, Tx-Rx beam pairs (2,1) and (3,1) may have higher priority values. Additionally, the weight for dynamic part of the priority values of Tx-Rx beam pairs (2, 1) and (3, 1) may also be greater, because their previous measurements of beam gain may be higher than other beam pairs.

As a result, the beam pairs including Rx beam 1 are measured more frequently than Rx beams 3 and 4. For example, as shown in FIG. 8, Rx beam 1 is paired with Tx beams 2 and 3 and measured more frequently while the Rx beam 3, which is located opposite of Rx beam 1 and has a NLoS, has far fewer opportunities to be selected for measurements.

Figure 9:
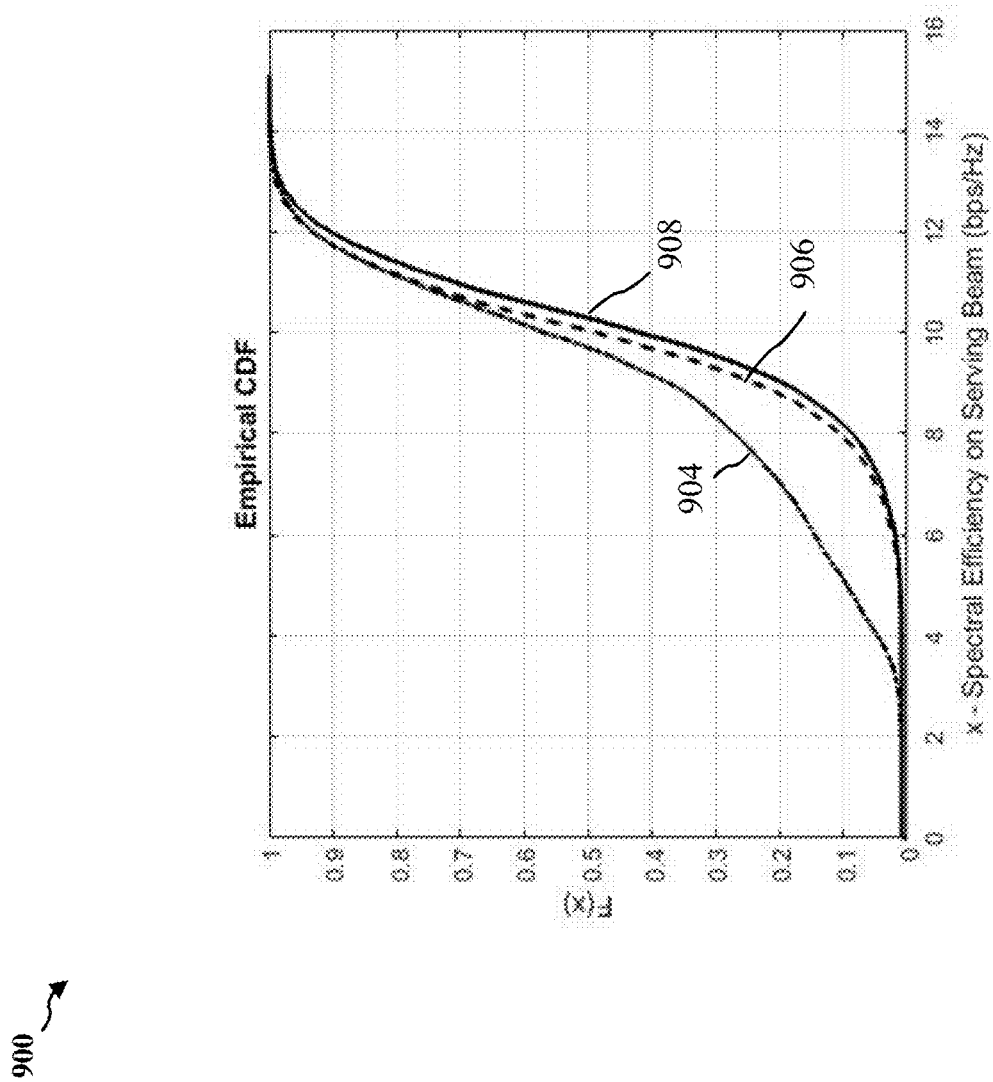
FIG. 9 show performance chart of different methods for selecting beam pairs for measurement, in accordance with one or more aspects of the present disclosure.

FIG. 9 shows the performance chart 900 of different methods for selecting beam pairs for measurement. The chart 900 is for a scenario where the Tx beams have a fixed Tx beam pattern and the UE is free to select Rx beam for measurements. One such scenario may be that the UE itself is in a fast rotation. While the UE is in a fast rotation, the serving Tx-Rx beam pair may need to be re-selected frequently to maintain a desirable performance in term of beam gains.

The Y axis of FIG. 9 shows the cumulative density function (CDF) F(x) values, representing the opportunity values for beam pairs being selected based on the designated method. The X axis show the beam gains for the designated beam pair selection method. The base line 904 represents the result of the fixed, round-robin beam pair selection method. The genie line 908 represents theoretical optimal results. The line 906 represent performance results based on the dynamic beam pair selection method, as described in the present disclosure, and illustrated in FIG. 7. The performance chart 900 show that the performance based on the dynamic beam pair selection method is very close to that of theoretical optimal line 908, and much better than that of the round-robin beam pair selection method.

FIG. 10 is a conceptual data flow diagram 1000 illustrating the data flow between different means/components in an exemplary apparatus 1002. The apparatus may be a mmW capable UE in communication with a base station. The apparatus includes a reception component 1004 that is configured to receive data and control information from the base station. For example, the reception component 1004 of the mmW capable UE may receive a set of Tx beams from the base station in a broadcast message.

The apparatus 1002 also includes a dynamic beam pair selection and measurement component 1006 that receives beam pairs from the reception component 1004, selects a candidate beam pair and measure the selected beam pair. The apparatus 1002 also includes a serving Tx-Rx beam pair determination component 1008 that receives measurement results from the beam pair selection and measurement component 1006, updates the priority value of each selected beam pair, based in part on the measurement results, and determines a new serving Tx-Rx beam pair based in part on the updated priority values. The apparatus 1002 further includes the transmission component 1010 that transmits the determined serving Tx-Rx beam pair to the base station 1050.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the transmission component 1010. In addition, the transceiver 1110 receives information from the processing system 1114, specifically the reception component 1004, and based on the received information, generates a signal to be applied to the one or more antennas 1120.

The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, and 1010. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) capable of millimeter wave (mmW) communication, comprising:
    selecting by the UE a Transmit (Tx)-Receive (Rx) beam pair from a plurality of Tx-Rx beam pairs available at the UE for measurement, based in part on a priority of the Tx-Rx beam pair, wherein the plurality of Tx-Rx beam pair comprises a set of Tx beams and a set of Rx beams;
    updating the priority of the selected Tx-Rx beam pair based in part on a combination of static information and dynamic information of the selected Tx-Rx beam pair;
    determining a new serving Tx-Rx beam pair based on priorities of the plurality of Tx-Rx beam pairs;
    ascertaining the selected Tx-Rx beam pair by re-measuring the selected Tx-Rx beam pair within a predetermined number of synchronization cycles; and
    switching to the new serving Tx-Rx beam pair after the predetermined number of synchronization cycles.

2. The method of claim 1, wherein the set of Tx beams has a fixed Tx beam pattern.

3. The method of claim 2, wherein selecting the Tx-Rx beam pair further comprises selecting a Rx beam based on the fixed Tx beam pattern.

4. The method of claim 2, wherein selecting the Tx-Rx beam pair further comprises selecting the Tx-Rx beam pair for a number of times that is proportional to the priority of the Tx-Rx beam pair in reference to priorities of other Tx-Rx beam pairs of the plurality of Tx-Rx beam pairs.

5. The method of claim 1, wherein the static information of Tx-Rx beam pair comprises a spatial relationship of the Tx-Rx beam pair, or a presence or an absence of line of sight between the Tx-Rx beam pair, or a combination thereof.

6. The method of claim 1, wherein the dynamic information comprises one or more of latest beam measurements of the Tx-Rx beam pair.

7. The method of claim 1, wherein updating the priority comprises at least one of:
    updating a first weight associated with the static information; or updating a second weight associated with the dynamic information; or combining the dynamic information and the static information of the Tx-Rx beam pair, based in part on the first weight and the second weight, in such a way that the priority is proportional to a chance the Tx-Rx beam pair being selected for measurement in relation to priorities of other Tx-Rx beam pairs of the plurality of Tx-Rx beam pairs; or a combination thereof.

8. The method of claim 1, wherein determining the new serving Tx-Rx beam pair further comprises selecting as the new serving Tx-Rx beam pair a Tx-Rx beam pair with a highest priority value upon ascertaining a priority for each of the plurality of the Tx-Rx beam pairs after the predetermined number of synchronization cycles.

9. An apparatus for wireless communication at a user equipment (UE), comprising:

means for selecting by the UE a Transmit (Tx)-Receive (Rx) beam pair from a plurality of Tx-Rx beam pairs available at the UE for measurement, based in part on a priority of the Tx-Rx beam pair, wherein the plurality of Tx-Rx beam pair comprises a set of Tx beams and a set of Rx beams;

means for updating the priority of the selected Tx-Rx beam pair based in part on a combination of static information and dynamic information of the selected Tx-Rx beam pair; and means for determining a new serving Tx-Rx beam pair based on priorities of the plurality of Tx-Rx beam pairs;

means for ascertaining the selected Tx-Rx beam pair by re-measuring the selected Tx-Rx beam pair within a predetermined number of synchronization cycles; and means for switching to the new serving Tx-Rx beam pair after the predetermined number of synchronization cycles.

10. The apparatus of claim 9, wherein the set of Tx beams has a fixed Tx beam pattern.

11. The apparatus of claim 10, wherein means for selecting the Tx-Rx beam pair further comprises selecting a Rx beam based on the fixed Tx beam pattern.

12. The apparatus of claim 10, wherein means for selecting the Tx-Rx beam pair further comprises selecting the Tx-Rx beam pair for a number of times that is proportional to the priority of the Tx-Rx beam pair in reference to priorities of other Tx-Rx beam pairs of the plurality of Tx-Rx beam pairs.

13. The apparatus of claim 9, wherein the static information of Tx-Rx beam pair comprises a spatial relationship of the Tx-Rx beam pair, or a presence or an absence of line of sight between the Tx-Rx beam pair, or a combination thereof.

14. The apparatus of claim 9, wherein the dynamic information comprises one or more of latest beam measurements of the Tx-Rx beam pair.

15. The apparatus of claim 9, wherein means for updating the priority comprises at least one of:

updating a first weight associated with the static information; or updating a second weight associated with the dynamic information; or combining the dynamic information and the static information of the Tx-Rx beam pair, based in part on the first weight and the second weight, in such a way that the priority is proportional to a chance the Tx-Rx beam pair being selected for measurement in relation to priorities of other Tx-Rx beam pairs of the plurality of Tx-Rx beam pairs; or a combination thereof.

16. The apparatus of claim 9, wherein means for determining the new serving Tx-Rx beam pair further comprises selecting as the new serving Tx-Rx beam pair a Tx-Rx beam pair with a highest priority value upon ascertaining a priority for each of the plurality of the Tx-Rx beam pairs after the predetermined number of synchronization cycles.

17. An apparatus for wireless communication, comprising:

a transceiver;

a memory; and at least one processor coupled to at least one of the memory and configured to:

select a Transmit (Tx)-Receive (Rx) beam pair from a plurality of Tx-Rx beam pairs for measurement, based in part on a priority of the Tx-Rx beam pair, wherein the plurality of Tx-Rx beam pair comprises a set of Tx beams and a set of Rx beams;

update the priority of the selected Tx-Rx beam pair based in part on a combination of static information and dynamic information of the selected Tx-Rx beam pair determine a new serving Tx-Rx beam pair based on priorities of the plurality of Tx-Rx beam pairs;

ascertain the selected Tx-Rx beam pair by re-measuring the selected Tx-Rx beam pair within a predetermined number of synchronization cycles; and switch to the new serving Tx-Rx beam pair after the predetermined number of synchronization cycles.

18. The apparatus of claim 17, wherein the set of Tx beams has a fixed Tx beam pattern.

19. The apparatus of claim 18, wherein the at least one processor is further configured to select the Tx-Rx beam pair by selecting a Rx beam based on the fixed Tx beam pattern.

20. The apparatus of claim 18, wherein the at least one processor is further configured to select the Tx-Rx beam pair by selecting the Tx-Rx beam pair for a number of times that is proportional to the priority of the Tx-Rx beam pair in reference to priorities of other Tx-Rx beam pairs of the plurality of Tx-Rx beam pairs.

21. The apparatus of claim 17, wherein the static information of Tx-Rx beam pair comprises a spatial relationship of the Tx-Rx beam pair, or a presence or an absence of line of sight between the Tx-Rx beam pair, or a combination thereof.

22. The apparatus of claim 17, wherein the dynamic information comprises one or more of latest beam measurements of the Tx-Rx beam pair.

23. The apparatus of claim 17, wherein the at least one processor is further configured to update the priority by at least one of:

updating a first weight associated with the static information; or updating a second weight associated with the dynamic information; or combining the dynamic information and the static information of the Tx-Rx beam pair, based in part on the first weight and the second weight, in such a way that the priority is proportional to a chance the Tx-Rx beam pair being selected for measurement in relation to priorities of other Tx-Rx beam pairs of the plurality of Tx-Rx beam pairs; or a combination thereof.

24. The apparatus of claim 17, wherein the at least one processor is further configured to determine the new serving Tx-Rx beam pair by selecting as the new serving Tx-Rx beam pair a Tx-Rx beam pair with a highest priority value upon ascertaining a priority for each of the plurality of the Tx-Rx beam pairs after the predetermined number of synchronization cycles.

* * * * *